United States Patent [19]

Rolfe

[11] Patent Number: 5,313,645
[45] Date of Patent: May 17, 1994

[54] METHOD FOR INTERCONNECTING AND SYSTEM OF INTERCONNECTED PROCESSING ELEMENTS BY CONTROLLING NETWORK DENSITY

[75] Inventor: David B. Rolfe, West Hurley, N.Y.

[73] Assignee: International Business Machines Corporation, Armonk, N.Y.

[21] Appl. No.: 698,866

[22] Filed: May 13, 1991

[51] Int. Cl.$^5$ .................. G06F 9/46; G06F 13/12; G06F 15/16; G06F 13/40

[52] U.S. Cl. ........................ 395/800; 364/228; 364/229; 364/229.5; 364/230.6; 364/231.9; 364/239.9; 364/240.2; 364/242.33; 364/242.94; 364/242.96; 364/242.5; 364/256.8; 364/265.3; 364/269.4; 364/271.2; 364/276.8; 364/284.4; 364/DIG. 1; 364/DIG. 2

[58] Field of Search ........... 395/800, 500, 200, 275, 395/375, 550, 325, 400, 425, 650, 775, 725; 364/DIG. 1, DIG. 2; 371/11.3

[56] References Cited

U.S. PATENT DOCUMENTS

| | | | |
|---|---|---|---|
| 4,739,476 | 4/1988 | Fiduccia | 395/800 |
| 4,811,214 | 3/1989 | Nosenchuck et al. | 395/800 |
| 4,868,818 | 9/1989 | Madan et al. | 371/11.3 |
| 5,058,001 | 10/1991 | Li | 395/500 |
| 5,134,690 | 7/1992 | Samatham | 395/200 |
| 5,170,482 | 12/1992 | Shu et al. | 395/800 |
| 5,187,801 | 2/1993 | Zenios et al. | 395/800 |
| 5,271,014 | 12/1993 | Bruck et al. | 371/11.1 |

OTHER PUBLICATIONS

Bhuyan et al., "Generalized Hypercube and Hyperbus Structures for a Computer Network", Apr. 1984, IEEE Computer, pp. 323-333.

Duncan, "A Survey of Parallel Computer Architectures", Feb. 1990, IEEE Computer, pp. 5-15.

Frieder, "Multiprocessor Algorithms for Relational-Database Operators on Hypercube Systems", Nov. 1990, IEEE Computer, pp. 13-28.

Primary Examiner—Alyssa H. Bowler
Assistant Examiner—Daniel H. Pan
Attorney, Agent, or Firm—Floyd A. Gonzalez; Robert L. Troike

[57] ABSTRACT

Computer elements in a massively parallel computer system are interconnected in such a way that the number of connections per element can be balanced against the network diameter or worst case path length. This is done by creating a topology that maintains topological properties of hypercubes yet improves flexibility by enumerating the nodes of the network in number systems whose base can be varied. Topologies are generated in which nodes are not always connected when their addresses differ in a single digit. A new variable d is introduced, the purpose of which is to control the overall density of the network by controlling the number of intermediate arc connections within the rings of the network.

7 Claims, 7 Drawing Sheets

METHOD FOR INTERCONNECTING AND SYSTEM OF INTERCONNECTED PROCESSING ELEMENTS BY CONTROLLING NETWORK DENSITY

BACKGROUND OF THE INVENTION

1. Field of the Invention

The present invention generally relates to the interconnection of processing elements to form massively parallel computer systems and, more particularly, to a method of interconnecting an unlimited number of processing elements in such a way that the number of connections per element can be balanced against the network diameter. The invention specifically provides non-binary hypercube networks.

2. Description of the Prior Art

As the cost of computer elements declines, the possibility of building very large networks is being realized. Ralph Duncan in "A Survey of Parallel Computer Architectures", Computer, February 1990, pp. 5 to 16, reviews alternative approaches to parallel processing. One class of parallel architecture described by Duncan involves multiple processors autonomously executing diverse instructions on diverse data, which Duncan classifies as MIMD for multiple instruction, multiple data streams. Within this class of parallel architecture are the ring, mesh, tree, and hypercube topologies. The ring topology is characterized as having a communication diameter of N/2 where N is the number of nodes. The communication diameter is defined as the worst case path length. In contrast, a two-dimensional mesh topology typically has a communication diameter of $2(N-1)$ where, again, N is the number of nodes, and this is also the typical communication diameter of tree topologies, although in both cases strategies have been employed to reduce the communication diameters.

Figure 1:
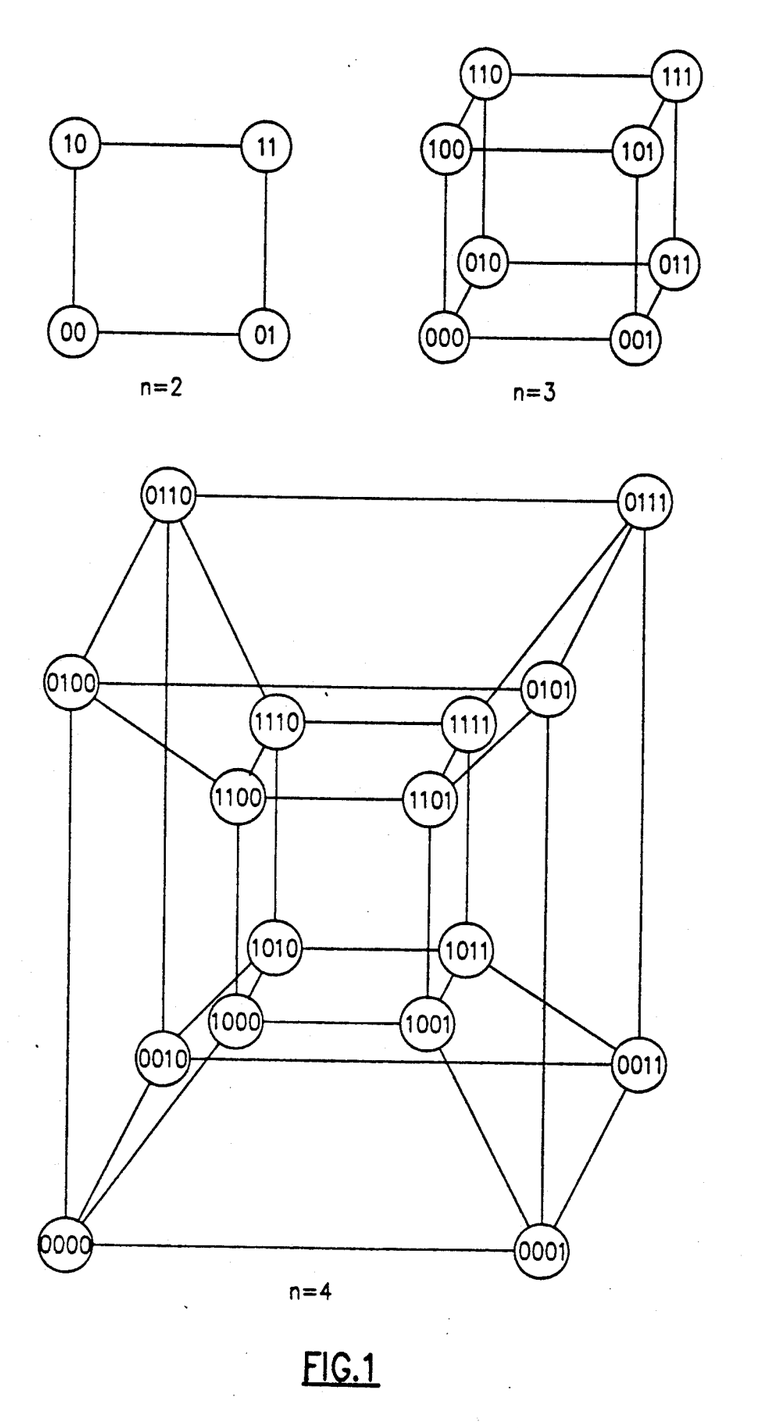
FIG. 1 is a pictorial representation of some exemplary Boolean hypercube topologies.

Of these known network topologies, the hypercube has some interesting topological properties. A Boolean n-cube or "hypercube" topology uses $N=2^n$ processors arranged in an n-dimensional array. Each node, or processor, in the array has $n=\log_2 N$ bidirectional links to adjacent nodes. FIG. 1 illustrates hypercubes for $n=2,3,4$. Examples of existing hypercube machines include Caltech's CosmicCube, Intel's iPSC/2 and NCube's Ncube/10. Descriptions of these and other hypercube computer systems are provided by John P. Hayes et al. in "Hypercube Supercomputers", *Proceedings of the IEEE*, vol. 77, no. 12, December 1989, pp. 1829 to 1841. Ophir Frieder in "Multiprocessor Algorithms for Relational-Database Operations on Hypercube Systems", Computer, November 1990, pp. 13 to 28, provides a tutorial on hypercube systems, particularly as database engines. Hayes et al. list a variety of representative applications for hypercube computers.

With specific reference to FIG. 1, note the numbering convention for the addresses of the nodes. For $n=2$, there are four nodes ($N=2^2$) with addresses 00, 10, 01, and 11. Each node is connected to two other nodes, and the rule applied is that each node is connected to an adjacent node having an address which differs by only one bit. For $n=3$, there are eight nodes ($N=2^3$) with addresses 000, 001, 010, 011, 100, 101, 110, and 111, but the connection scheme is the same with, for example, node 000 being connected to nodes 001, 010 and 100. There are sixteen nodes for the case where $n=4$ ($N=2^4$), but still the same connection scheme is employed. Laxmi N. Bhuyan and Dharma P. Agrawal in "Generalized Hypercube and Hyperbus Structures for a Computer Network", *IEEE Transactions on Computers*, vol. c-33, no. 4, April 1984, pp. 323-333, describe a generalization of the binary hypercube to a variable radix numbering. In this scheme, the nodes of a network are numbered in a system in which each digit of the number can be based on a different radix. Nodes are connected whenever the resulting node addresses differ in exactly one digit.

While hypercube architectures offer some very attractive topological properties, as these networks go beyond a few thousand nodes, the numbers of connections per node and path lengths grow in fixed ways. If either connections per node or path lengths become too large for a given technology, the designer is forced to develop new network algorithms from scratch. These new ad hoc topologies may then adversely effect the performance of existing programs that ran well on smaller networks with older topologies.

SUMMARY OF THE INVENTION

It is therefore an object of the present invention to a provide a method of interconnecting processors to form a generalized hypercube structure that supports an unlimited number of nodes.

It is another object of the invention to provide a computer structure formed of interconnected processors wherein the number of interconnections per processor is adjusted against the network diameter.

According to the invention, there is provided a method for interconnecting processing elements in such a way that the number of connections per element can be balanced against the network diameter. This is done by creating a topology that maintains many of the well known and desirable topological properties of hypercubes while improving flexibility by enumerating the nodes of the network in number systems whose base can be varied. When using a base two number system, this method creates the familiar Boolean binary hypercube topology. However, in contrast to a Boolean binary hypercube, the practice of the invention results in a non-binary hypercube having fewer interconnections permitting the practical realization of very large computer systems having an unlimited number of nodes.

The subject invention is a refinement of the scheme described by Laxmi N. Bhuyan and Dharma P. Agrawal, supra. The invention generates topologies in which nodes are not always connected when their addresses differ in a single digit. The invention introduces a new variable d, the purpose of which is to control the overall density of the network by controlling the number of intermediate arc connections within the rings of the network. For a network having N nodes, the assumption is made that there exist positive integers b and n such that $N=b^n$. The new variable d is picked such that $1 \leq d \leq b/2$, if b is even, and $1 \leq d \leq (b-1)/2$, if b is odd. The nodes of the network are numbered to the base b. Two nodes, x and y, of the network are connected if and only if 1. the address of x differs from the address of y in exactly one digit, and
2. for the digit i where $x_i \neq y_i$, $y_i = (x_i + j) \mod b$ or $y_i = (x_i - j) \mod b$ for some $j \leq d$.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Before describing a specific implementation of the invention, the network connection algorithm is discussed in general terms. The algorithm is based on the assumption that there exists positive integers b and n such that $N = b^n$, where N is the number of nodes in the network. An integer d is chosen between one and b/2, if b is even, or between one and (b−1)/2, if b is odd. Once the integer d has been selected, the nodes of the network are numbered to the base b. In other words, $$N = a_m b^m + a_{m-1} b^{m-1} + \ldots + a_1 b^1 + a_0 b^n,$$

where $a_0, a_1, \ldots, a_{m-1}, a_m$ are non-negative integers each less than b. For a base ten (b=10) number system, the symbols $a_i$ are called "digits", and for a base two (b=2) number system, the symbols $a_i$ are called "bits". Without loss of generality, the symbols $a_i$ are referred to hereinafter as "digits" even though the base number system may be other than ten.

Next, connect two nodes, x and y, of the network if and only if 1. the address of x differs from the address of y in exactly one digit, and
2. for the digit i where $x_i \neq y_i$, $y_i = (x_i + j) \mod b$ or $y_i = (x_i - j) \mod y$ for some $j \leq d$.

Notice that $-x \mod b = (y-x) \mod b$. For example, if b=5 and d=1, then a node whose address is 1234 would be connected to nodes having addresses 2234, 0234, 1334, 1134, 1224, 1244, 1233, and 1230. Notice that d controls the density of the network. The larger d becomes, the denser the network becomes.

During the application of the algorithm, the ports of the various nodes are labeled to indicate both the digit and digit value of the node to which they connect. For example, a port labeled 3,7 would connect to a node whose third digit is 7. The number of connections per node is $\mu \log_b N$, where $\mu = 2d$, except if b is even and d=b/2 in which case $\mu = b-1$. This can be seen to be true by considering that for each integer less than or equal to d, there are two connections for each digit of a node address. The number of digits in the node address is $\log_b$. The diameter of the network is given by $$\frac{b-1}{\mu} (\log_b N)$$

where $$\frac{b-1}{\mu}$$

is always rounded up to the next integer when it is not an integer.

Figure 2:
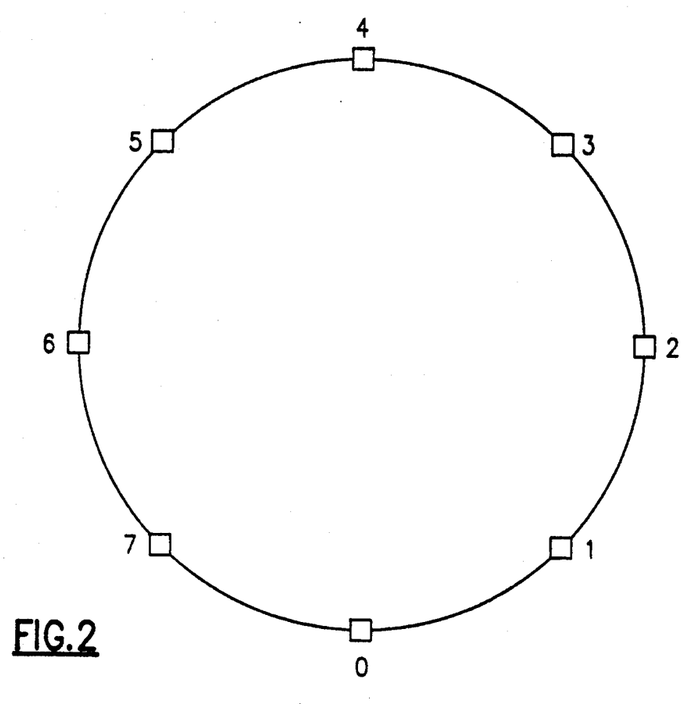
FIG. 2 shows the topology of a typical ring in a base 8 network where d=1.
Figure 3:
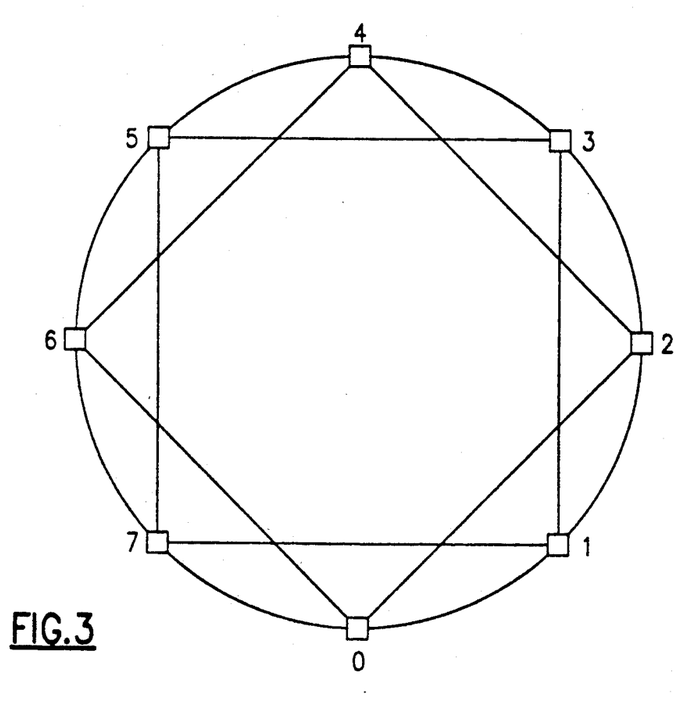
FIG. 3 shows the topology of a typical ring in a base 8 network where d=2.
Figure 4:
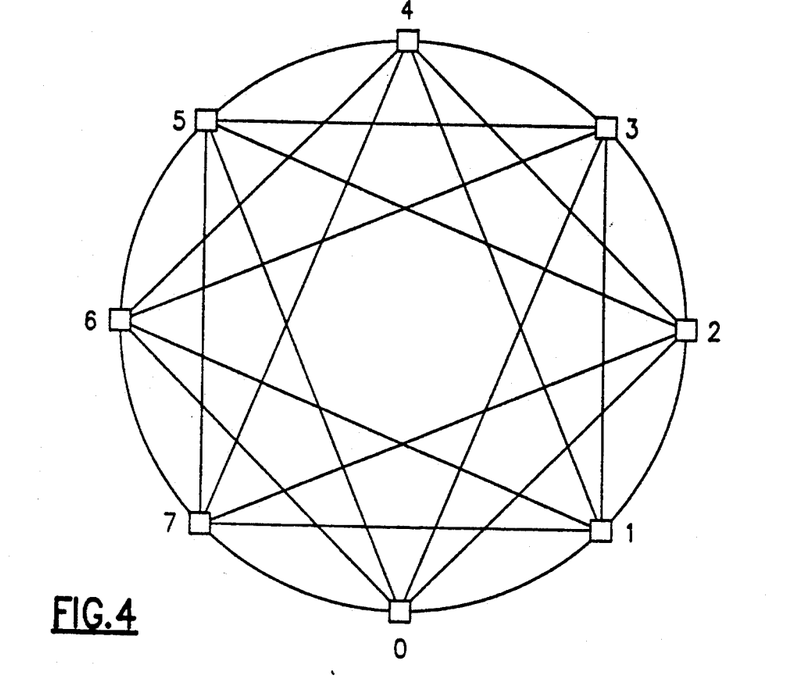
FIG. 4 shows the topology of a typical ring in a base 8 network where d=3.
Figure 5:
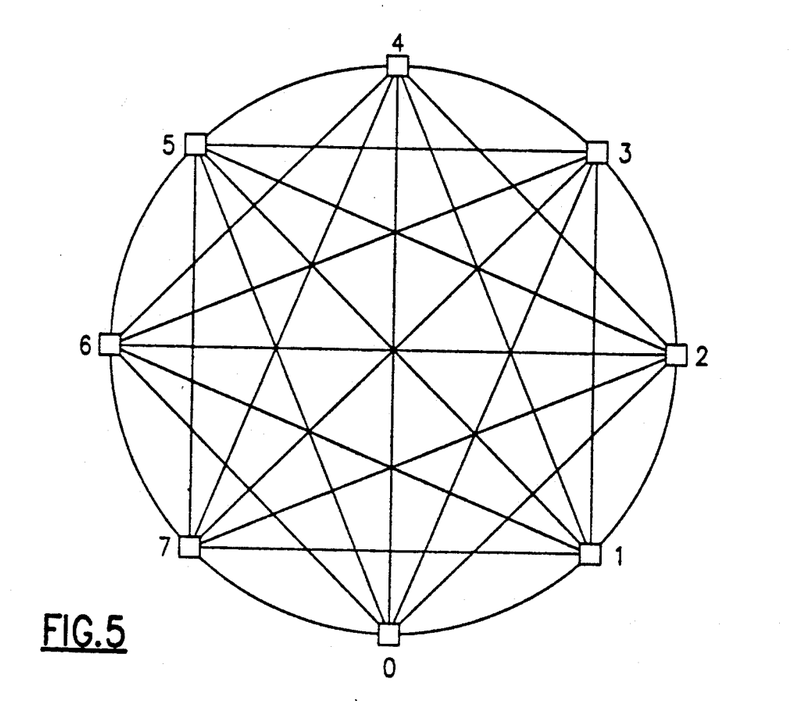
FIG. 5 shows the topology of a typical ring in a base 8 network where d=4.

Referring now to the drawings, and more particularly to FIG. 2, there is shown the topology of a typical ring in a base 8 (i.e., b=8) network where d=1. There are eight computers or nodes, N, in this network so that n=1 or $N = 8^1$. While this illustration is trivial, the next three figures illustrate the effect of increasing the value of d on the density of the network. FIG. 3 shows the case for d=2. In this case, each computer connects to four other computers. FIG. 4 shows the case for d=3. In this case, each computer connects to six other computers. FIG. 5 shows the case for d=4. In this case each computer connects to seven other computers. Thus, FIGS. 2, 3, 4, and 5 provide a graphic illustration of the increasing density of a simple eight node network for an increasing value of d.

Figure 6:
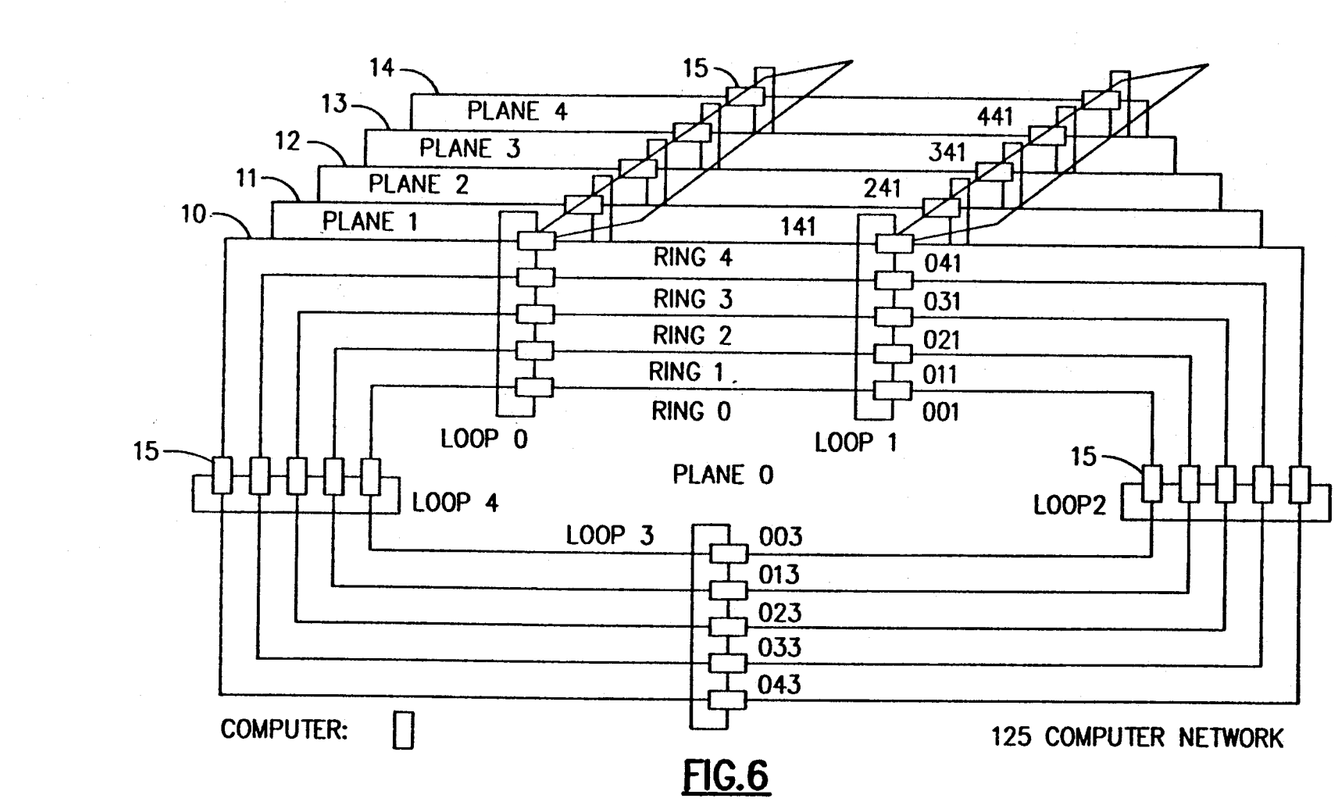
FIG. 6 is a block diagram of a 125 computer network where b=5, n=3 and d=1.

A more practical application of the interconnection technique according to the invention is illustrated in FIG. 6 which shows a 125 computer network. In this example, the base, b, is set to equal five so that n=3; that is, $N = b^n = 5^3 = 125$. In order to minimize the density of this network, d is set equal to one. This network is implemented in five planes 10, 11, 12, 13, and 14, with each plane having twenty-five computers 15. Within each plane there are five rings and five loops. Each computer in the network is connected to six other computers, two computers within its ring, two computers within its loop and two computers in different planes.

Even for this still relatively simple network, the selection of the variable d allows a control of the density of the network not known in the prior art. The network shown in FIG. 6 may be easily realized as a practical embodiment of five printed circuit boards with edge connectors. However, the invention is especially useful for very large networks where interconnection densities become critical to whether an implementation is realizable in the real world.

Figure 7:
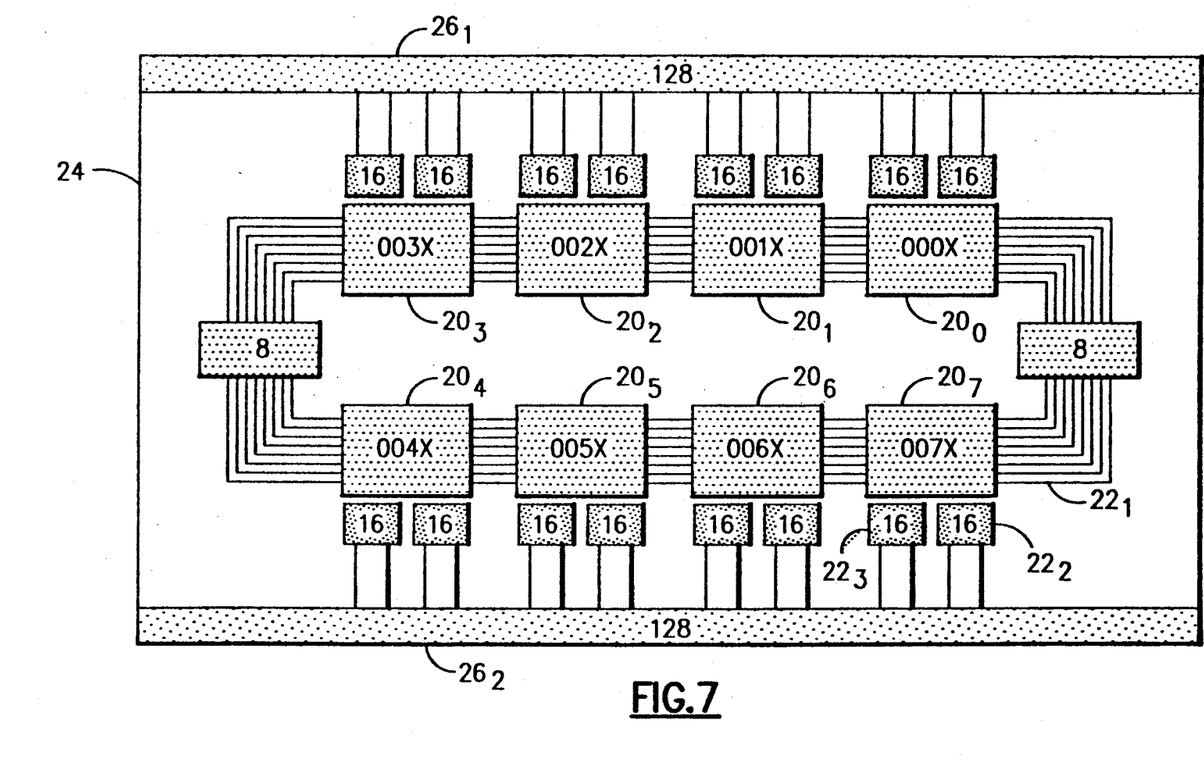
FIG. 7 is a block diagram of the lowest level of packaging of an implementation of the invention composed of 4096 nodes.
Figure 8:
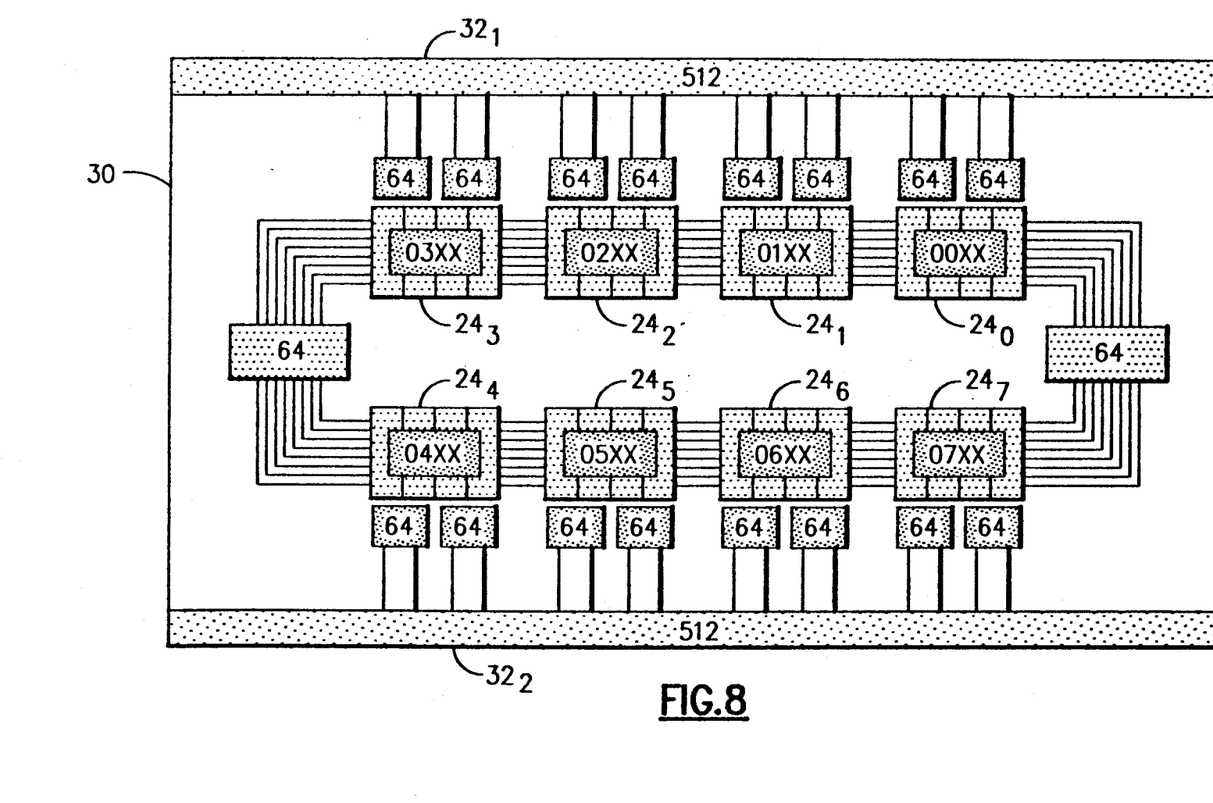
FIG. 8 is a block diagram of the next level of packaging of the embodiment shown in FIG. 7.
Figure 9:
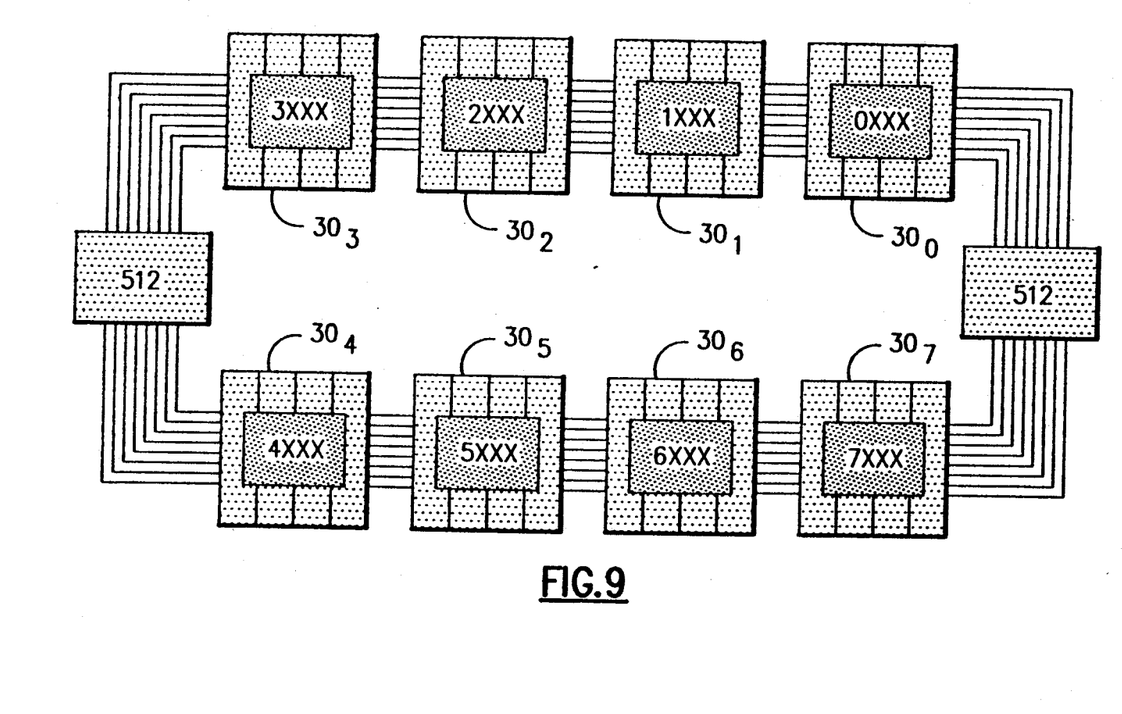
FIG. 9 is a block diagram of the highest level of packaging of the embodiment shown in FIG. 7 of the drawings.

To illustrate this, a specific implementation of the invention for d=1, b=8 and n=4 is shown in FIGS. 7, 8 and 9. Thus, for this implementation $N = b^n = 8^4 = 4096$. For this very large number of nodes, the density variable d is chosen to be one to minimize the density.

FIG. 7 shows the lowest level of packaging. Each box $20_0$ to $20_7$ contains eight computers interconnected with forty-eight (3×16) data paths $22_1$, $22_2$ and $22_3$ per box. The complete package 24 in FIG. 7 thus contains sixty-four (8×8) computers. The package 24 is interconnected to the rest of the computers in the system with 256 (2×128) data paths $26_1$ and $26_2$.

FIG. 8 shows the next level of packaging. Each package $24_0$ to $24_7$ contains 64 computers with 256 data paths as shown in FIG. 7. The larger package 30 thus contains 512 (8×64) computers supporting 1024 (2×512) data paths. FIG. 9 shows the highest level of packaging containing eight packages $30_0$ to $30_7$, each containing 512 computers and 1024 data paths. There are 4096

(8×512) computers with 1024 data paths in the highest level of packaging.

In this network of 4096 nodes, each node is directly connected to only eight other nodes. This permits any node to communicate with any other node in the network by involving no more than sixteen intermediate nodes. This compares well with the case of the Boolean binary hypercube which demands a denser network with each node connected to twelve other nodes rather than eight. Thus, the invention allows for a reduction of 33% in wiring density as compared with the Boolean binary hypercube. This reduction, however, is traded for a concomitant 33% increase in network diameter.

To route messages in a network according to the invention, first compare the destination address with the current address. If they are the same, routing has been completed. If not, select some digit, i, for which the current and destination addresses are different. Forward the message out of the port for this digit that differs from the destination address by the least amount. Continue this procedure until the current and destination addresses are equal. Note that the selection of the digit to work on at a particular time can be based on which ports are not busy or damaged. This is common procedure for hypercubes. A port is said to be damaged if the port itself is damaged or the port to which it connects is damaged.

The invention simplifies the interconnection of massively parallel computer systems yet preserves the desirable properties of a hypercube. These properties are (1) a large number of alternate paths, (2) very high aggregate bandwidth, and (3) uniform connections. Existing methods can be used to used to route messages within the network. Generally, the invention provides a non-binary hypercube with less density thereby allowing the practical realization of massively parallel computer systems having an unlimited number of nodes, but as illustrated in FIG. 6, the invention also has practical application for smaller computer networks.

While the invention has been described in terms of illustrative and preferred embodiments, those skilled in the art will recognize that the invention can be practiced with modification within the spirit and scope of the appended claims.

Having thus described my invention, what I claim as new and desired to secure by Letters Patent is as follows:

1. A computer system in a form of a non-binary hypercube comprising:

a plurality of nodes, N, where $N=b^n$, b and n being positive integers and $b>2$, each node having an identifying address numbered according to a number system base b;

means for determining an address of each of said plurality of nodes; and means for interconnecting each respective node of said plurality of nodes to nodes having addresses differing from the respective node's address by exactly one digit to form a toroidal network, a number of connections per node being $\mu \log_b N$, where $\mu=2d$, $1 \leq d \leq b/2$ if b is even and $1 \leq d \leq (b-1)2$ if b is odd, except if b is even and $d=b/2$, in which case $\mu=b-1$, to thereby control density of said toroidal network, wherein two nodes, x and y, of the network are connected if and only if 1. an address of x differs from an address of y in exactly one digit, and
2. for a digit i where $x_i \neq y_i$, $y_i=(x_i+j)$ mod y or $y_i=(x_i+j)$ mod y for some $j \leq d$.

2. The computer system recited in claim 1 wherein $b=8$, $n-1$, and $d=2$.

3. The computer system recited in claim 1 wherein $b=8$, $n=1$, and $d=3$.

4. The computer system recited in claim 1 wherein $b=8$, $n=1$, and $d=4$.

5. The computer system recited in claim 1 wherein $b=5$, $n=3$, and $d=1$.

6. The computer system recited in claim 1 wherein $b=8$, $n=4$, and $d=1$.

7. A computer implemented method of interconnecting a plurality of nodes in a network comprising steps of:

providing a plurality of nodes;

defining b and n such that a number N of said plurality of nodes equals $b^n$ and b and n are positive integers and $b>2$;

choosing a positive integer d such that $1 \leq d \leq b/2$ if b is even and $1 \leq d \leq (b-1)/2$ if b is odd;

defining an address for respective ones of each of the plurality of nodes by numbering them using numbers represented by a base b numbering system;

determining an address of each of said plurality of nodes; and connecting two nodes of said plurality of nodes, to thereby form a toroidal network, if and only if an address of a first one of said two nodes of said plurality of nodes differs from an address of a second one of said two nodes of said plurality of nodes in exactly one digit, a $i^{th}$ digit and, for a unique $i^{th}$ digit of the addresses of said two nodes, symbolized by $x_i$ and $y_i$, respectively, where $x_i \neq y_i$, $y_i=(x_i+j)$ mod y or $y_i=(x_i+j)$ mod y for some $j \leq d$ to thereby control density of said toroidal network.

* * * * *